United States Patent Office 3,661,791
Patented May 9, 1972

3,661,791
METHOD OF PREPARING RARE EARTH METAL PHOSPHATE VANADATE LUMINESCENT COMPOSITIONS HAVING ACICULAR CRYSTAL HABIT
Richard C. Ropp, Warren, N.J., assignor to Westinghouse Electric Corporation, Pittsburgh, Pa.
Filed Jan. 16, 1970, Ser. No. 3,403
Int. Cl. C09k 1/36, 1/44
U.S. Cl. 252—301.4 P          10 Claims

ABSTRACT OF THE DISCLOSURE

Separately precipitated rare-earth metal orthophosphate and separately precipitated rare-earth metal orthovanadate are admixed and fired to form a solid solution phosphor composition exhibiting a unique acicular crystal habit. The compositions are particularly useful for high pressure mercury vapor lamps. This method utilizing separately precipitated orthophosphate and orthovanadate results in a very homogeneous solid solution of these compositions exhibiting superior luminescence.

BACKGROUND OF THE INVENTION

Solid solutions of rare-earth metal phosphate and rare-earth metal vanadate are known in the prior art. These solid solutions find particular application in color corrected high pressure mercury vapor discharge lamps. The vanadate component is known to emit very well in particular portions of the spectrum depending upon the activator present, and the phosphate exhibits a superior maintenance. The prior art solid solutions represent attempts to optimize the desired luminescence and optimize the maintenance of output.

The prior art technique for preparing orthovanadate-orthophosphate solid solutions involved heating a mixture of rare-earth metal oxides, vanadium pentoxide, and heat decomposable phosphate compound to form the solid solution. This technique has the standard disadvantages of a solid state firing in that non-uniform compositions genereally result because of the difficulty in effecting the formation of the orthovanadate and orthophosphate at the same time the solid solution is forming. These non-uniform materials exhibit a low brightness and can have a brown body color. Particular ratios of phosphate to vanadate are known to be preferred in optiminzing luminescent performance.

In the prior art methods of phosphor preparation, the final ratio of phosphorus to vanadium, which was known to be desired in a predetermined ratio to provide a high efficiency material, was difficult to maintain throughout the mass of the composition upon firing. A specific ratio might be provided in the raw mix, but through volatilization of the vanadium or phosphorus, this ratio was not maintained during preparation. Typically the solid solution vanadate-phosphate prepared by these prior art methods exhibited a brown body color which is due to an excess of vanadium pentoxide which required further processing of the composition.

SUMMARY OF THE INVENTION

It has been discovered that a very homogeneous solid solution of the orthophosphate-orthovanadate composition can be provided by utilizing the separately precipitated rare-earth metal orthophosphate and separately precipitated rare-earth metal orthovanadate as the basic raw mix constituents in preparing the solid solution luminescent composition.

It has been discovered that the ratio of phosphorus to vanadium can be maintained in the final composition as the same ratio provided in the raw mix and a very homogeneous solid solution composition prepared when the precipitated orthophosphate and orthovanadates are utilized in the raw mix. Furthermore, when the precipitated orthophosphate and orthovanadate raw mix constituents are utilized, the crystal habit of the resulting solid solution orthovanadate - orthophosphate substantially comprises acicular or needle-like particles which are about 10 microns long by about 2 microns wide, which material is contrasted with the standard dodecahedron morphology which is typical of the prior art solid solutions. The phosphor solid solutions prepared by the present method exhibit a substantial improvement of fluorescent intensity and maintenance over the prior art compositions.

BRIEF DESCRIPTION OF THE DRAWINGS

For a better understanding of the product invention, reference may be had to the exemplary embodiment shown in the accompanying drawings in which.

DESCRIPTION OF THE PREFERRED EMBODIMENTS

Figure 1:
FIG. 1 is an electron-photomicrograph at 20,000 magnification (1cm.=0.5 micron) of prior art solid solution of yttrium-europium orthophosphate-orthovanadate.

The preparation of europium activated yttrium orthophosphate-orthovanadate solid solution luminescent composition will be described by way of a specific example. Precipitated europium doped yttrium orthovanadate can be prepared as follows: Dissolve about 182 grams of vanadium pentoxide in about 1 liter of concentrated hydrochloric acid, about 30% by weight HCl, resulting in a dark blue solution, and dilute to about 2 liters using distilled water. Dissolve about 225.8 grams of yttrium oxide and 26.4 grams of europium oxide in about 1 liter of 8 molar concentration hydrochloric acid, and dilute this solution to 2 liters total volume by adding distilled water. This rare-earth metal containing solution is slowly added to the vanadyl radical containing solution. A mixture is prepared of about 1200 milliliters of concentrated ammonium hydroxide, 28% reagent, and 200 milliliters of hydrogen peroxide, 30% reagent. This mixed reagent solution of ammonium hydroxide and hydrogen peroxide is slowly added to the mixed rare-earth metal containing acid solution and the vanadyl solution, with the initial acid pH slowly increasing. The addition should be stopped at about pH 8.2 and the resulting precipitate allowed to settle. The settled precipitate is filtered and dried. This precipitation technique is set out in greater detail in copending application Ser. No. 808,320, filed Mar. 18, 1969 now U.S. Pat. No. 3,580,861, owned by the assignee of the present application.

As explained in the above-mentioned copending application, the yttrium orthovanadate is precipitated by admixing a vanadyl radical containing acid solution with predetermined amounts of yttrium containing acid solution, ammonium hydroxide, and hydrogen peroxide, with the ratio of vanadyl radical to yttrium being about 1:1, and the amount of ammonium hydroxide sufficient to raise the pH of the resulting mixture to at least greater than 7. The rate of mixture is such as to provide a fairly constant rate of change of pH, and the resulting mixture is maintained at about 80° C. to optimize the precipitation process.

Another method of precipitating rare-earth metal orthovanadate is set forth in copending and now allowed application Ser. No. 877,858, filed Nov. 18, 1969, also owned by the assignee of the present application.

Precipitated yttrium orthophosphate doped with europium can be prepared as followss: Dissolve about 45.2 grams of yttrium oxide and about 5.28 grams of europium oxide in about 90 milliliters of concentrated nitric acid. This solution is then diluted to about 1 liter total volume with distilled water. A 2.4 molar solution of reagent grade phosphoric acid is heated to about 80° C. and the rare-earth metal ion containing acid solution which was also at about 80° C. is added to the phosphoric acid solution, slowly, and at a predetermined rate to form the precipitate, which is allowed to settle, with the supernatant liquid being decanted and the separated precipitates being washed and dried. The precipitated phosphate will be a hydrate of $(Y,Eu)PO_4.5/3H_2O$. The water content can vary somewhat without affecting phosphor quality. The above-prepared, separately precipitated orthophosphate and orthovanadate are added together in predetermined amounts to form the desired ratio of vanadate to phosphate for the final composition raw materials. The raw materials are thoroughly mixed by suitable means and are fired in air for at least one hour at a temperature of at least 900° C., and preferably at about 1200° C. This orthophosphate precipitation technique is set out in greater detail in copending application Ser. No. 736,839, filed June 13, 1968 now U.S. Pat. 3,507,804.

The above-mentioned copending application teaches that the orthophosphate is precipitated when a first aqueous rare-earth metal containing solution, wherein the concentration of rare-earth metal is from 0.1 to 6 gram-atoms per liter, is slowly added to a second orthophosphoric acid solution in an amount such that the gram-atom to gram-mole ratio of rare-earth metal to orthophosphoric acid is from about 1:1 to about 1:9, while maintaining the resulting mixture at 40° C. or greater.

It has been discovered that only when the precipitated hydrated yttrium-europium orthophosphate and the precipitated yttrium-europium orthovanadate are used to supply the phosphorus and vanadium does the final product consist substantially of the distinctive acicular or needle-like particle habit material.

This acicular particle habit material exhibits an approximately 15% improvement in red lumen output as well as an improvement in maintenance of this output over the prior art solid solutions of yttrium-europium orthovanadate-orthophosphate. The preferred ratio of phosphorus to vanadium for optimized red lumen output which is desirable for color correcting high pressure mercury vapor lamps is about a 6:4 atom ratio, with the europium activator content being about 7.5 mole percent of the total of yttrium and europium.

Figure 2:
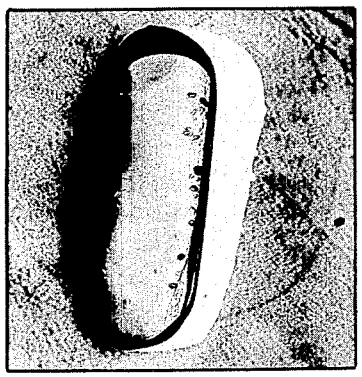
FIG. 2 is an electron-photomicrograph at 20,000 magnification of a small acicular phosphor particle produced by the present invention.
Figure 3:
FIG. 3 is an electron-photomicrograph at 20,000 magnification of one end of the more typical acicular phosphor particle size which comprises about 80% by volume of the particles produced in accordance with the present method

The europium activator concentration can be widely varied as is known in the art, for example from about one to twenty mole percent of the total yttrium plus europium. The unique solid-solution particle habit is readily seen in FIGS. 2 and 3, where the acicular or needle-like particles shown in FIG. 3 are about ten microns long with about a two micron average thickness. These approximately 10 micron long particles comprise about 80 percent by volume of the final solid-solution product, with the remainder being smaller acicular particles such as seen in FIG. 2, and some amount of irregular fine particles. The particle habit smoothness and regularity can be readily contrasted with the typical prior art orthophosphate-orthovanadate.

When other raw mix constituents are used to supply the phosphorus and vanadium, typically diammonium phosphate and sodium metavanadate or vanadium pentoxide, only a small portion of the final product will consist of the acicular particle habit that has been found to yield superior output.

While an atom ratio of about 6:4 of phosphorus to vanadium is preferable in the solid solution luminescent composition, this ratio can be widely varied. A good red lumen output and maintenance of output is observed when this atom ratio or the gram-mole ratio of orthophosphate to orthovanadate is varied from about 7:3 to 4:6.

The firing condition can be widely varied with the temperature being from about 900–1300° C. with a minimum firing time of about one hour, with the lower the temperature the longer the firing time. An oxidizing atmosphere such as air is provided to insure that the europium is in the trivalent state.

Other lanthoxide series rare-earth metals can be substituted for the europium activator in practicing the method described. Dysprosium metal activation of the solid solutions has been found particularly advantageous. The dysprosium activator proportion is preferably from about 0.2 mole percent to about one percent of the total of yttrium plus dysprosium.

The dysprosium activated yttrium orthophosphate-orthovanadate solid solution yields total energy emission of more than 200 percent of a commercial yellow halophosphate phosphor when each are excited by the same ultraviolet excitation source. The material exhibits the same superior stability and crystal morphology already described for the red-emitting europium activated phosphor. In addition, it has been discovered that yellow-emitting dysprosium activated solid solutions can utilize a wide phosphate to vanadate ratio which ranges as high as 19:1 yet can be as low as 1:9. The higher phosphate to vanadate ratios are preferred to optimize efficiency for this material which is a further advantage since high phosphate to vanadate ratio solid solutions give superior performance in low pressure fluorescent and mercury vapor discharge lamps.

A small amountof flux for promoting the formation of solid solution may be added to the raw mix of the precipitated orthophosphate and orthovanadate, for example, yttrium borate, sodium metavanadate, or potassium metavanadate may be added in an amount of about 5–10 weight percent of the total raw mix. These flux materials can be easily removed by washing after the firing which forms the solid solution phosphate-vanadate luminescent composition.

It has also been discovered that the yttrium borate flux, which can be used in promoting the reaction of phosphate and vanadate to form a solid solution, is preferably prepared by precipitation. For example, a hydrated yttrium borate can be precipitated by the following procedure: Dissolve about 56.46 grams of yttrium oxide in 100 millimeters of concentrated nitric acid and dilute to a half liter with distilled water dissolved without 30.92 grams of boric acid and 0.5 liter distilled water. Heat both solutions to 80° C. and add the boric acid solution to the rare-earth metal containing solution with continuous stirring and the temperature maintained at 80° C. A 1 liter solution of 2.5 molar ammonium hydroxide solution is added very slowly to this mixture. This addition will effect a homogeneous precipitation and produce a very homogeneous yttrium borate hydrate at very accurate stoichiometry. The precipitate is settled out, separated, washed and dried and is ready for use as a flux in promoting phosphate-vanadate solid state reaction. In preparing yttrium-europium orthophosphate-orthovanadate solid-solution for use as a color correction phosphor for use with high pressure mercury vapor devices, it has been discovered that a mol ratio of 58 percent orthophosphate, 39 percent orthovanadate, and 3 percent yttrium borate is particularly advantageous. The resulting solid solution has a very high lumen output with high maintenance.

It is possible to utilize various rare-earth metals in producing the hydrated borate and also to prepare borate luminescent compositions by including an activating portion of rare-earth metal and firing the rare-earth metal borate at, for example, 1200° C. for about 2 hours. As an example, an efficient red-emitting phosphor is had when europium is substituted for yttrium in an amount of about 7 atom percent in preparing the precipitated borate. As noted above, other rare-earth metal activators and rare-earth matrix constituents can be utilized in producing the family of rare-earth metal borate phosphors. In producing the hydrated borate, it is also possible to use urea in place of ammonium hydroxide with the amount being determined to provide a comparable amount of ammonia radical as supplied by the ammonium hydroxide solution. The borates produced can be expressed by the formula $YBO_3 \cdot xH_2O$, wherein $x$ can be 3 or 7.

In general, the precipitated hydrated rare-earth metal borate can be prepared by preparing an acidic boron-containing solution, adding thereto an acidic rare-earth metal containing solution, and titrating the resulting mixture with an ammonia radical containing solution to render the final mixture neutral or slightly basic and thereby cause the rare-earth metal borate to precipitate. The precipitate is readily separated by decantation.

I claim as my invention:

1. Method of preparing solid solutions of yttrium orthovanadate-orthophosphate activated by selected lanthoxide series rare-earth metals, wherein the ratio of solid solution ratio of orthovanadate to orthophosphate is accurately maintained at a predetermined ratio as provided in the raw mix, which method comprises;
   (a) precipitating from a solution stoichiometric hydrated yttrium orthophosphate containing an activating proportion of lanthioxide series rare-earth metal;
   (b) precipitating from a solution stoichiometric yttrium orthovanadate containing an activating proportion of lanthoxide series rare-earth metal;
   (c) admixing predetermined proportions of said precipitated orthophosphate and orthovanadate as desired in said final solid solution; and
   (d) firing the resulting mixture at a temperature sufficient to effect the formation of a luminescent solid solution of said orthophosphate-orthovanadate.

2. The method as specified in claim 1, wherein when said rare-earth metal is europium the gram-mole ratio of orthophosphate or orthovanadate provided is from about 7:3 to 4:6.

3. The method as specified in claim 1, wherein when said rare-earth metal is europium the gram-mole ratio of orthophosphate to orthovanadate provided is preferably 6:4.

4. The method as specified in claim 1, wherein when said rare-earth metal is dysprosium the gram-mole ratio of orthophosphate to orthovanadate is from about 19:1 to 1:9.

5. Solid solution of yttrium orthophosphate-orthovanadate activated by selected lanthoxide series rare-earth metals prepared as specified in claim 1, which sold solutions substantially comprise an acicular particle habit material about 10 microns by about 2 microns, and which are efficiently excited by ultraviolet radiations with a high level of maintenance of light output.

6. The method as specified in claim 1, wherein said firing is carried out in an oxidizing atmosphere at a temperature of from about 900–1300° C., for at least one hour, with the lower the temperature the longer the firing time.

7. The method as specified in claim 1, wherein precipitated hydrated yttrium borate in an amount of about 10 mole percent is included with said orthophosphate and said orthovanadate in preparing said solid solution.

8. The method as specified in claim 7 wherein when precipitated yttrium borate is added, the gram-mole ratio or orthophosphate to orthovanadate is preferably 45:45, and said yttrium borate is added in an amount of about 10 mole percent of mixture of orthophosphate and orthovanadate.

9. The method as specified in claim 7, wherein said yttrium borate is prepared by the method comprising;
   (a) preparing an acidic boron-containing solution;
   (b) adding thereto an acidic rare-earth metal containing solution;
   (c) titrating the resulting mixture of acidic boron and rare-earth metal containing solution with an ammonia radical containing solution to render the solution neutral causing the rare-earth metal borate to precipitate; and
   (d) separating the precipitate from the solution.

10. A luminescent composition consisting essentially of a solid solution of yttrium orthophosphate-yttrium orthovanadate matrix and activated by one of europium or dysprosium, in the case of europium activation the molar ratio of phosphate to vanadate being from 7:3 to 4:6 and the europium being present in amount of from about one to twenty atom percent taken with respect to the total moles of phosphate plus vanadate, in the case of dystprosium activation the molar ratio of phosphate to vanadate being from 19:1 to 1:9 and the dysprosium being present in amount of from 0.2 to 1 atom percent taken with respect to the total moles of phosphate plus vanadate, and said phosphor having a crystal morphology such that substantially all individual particles exhibit a needle-like configuration.

References Cited

UNITED STATES PATENTS

| | | | |
|---|---|---|---|
| 3,417,027 | 12/1968 | Wanmaker et al. | 252—301.4 R |
| 3,501,412 | 3/1970 | Ropp | 252—301.4 R |
| 3,507,803 | 4/1970 | Wanmaker et al. | 252—301.4 R |
| 3,507,804 | 4/1970 | Ropp | 252—301.4 P |

ROBERT D. EDMONDS, Primary Examiner